United States Patent [19]

Steinicke

[11] Patent Number: 5,066,450

[45] Date of Patent: Nov. 19, 1991

[54] METHOD FOR MAKING PREFORMED MASKANT SHEETS

[75] Inventor: Arlo M. Steinicke, Victorville, Calif.

[73] Assignee: Rohr Industries, Inc., Chula Vista, Calif.

[21] Appl. No.: 386,306

[22] Filed: Jul. 28, 1989

[51] Int. Cl.⁵ ............................................. B29C 41/08
[52] U.S. Cl. .................................... 264/504; 264/500; 425/DIG. 37
[58] Field of Search ...................... 264/500, 504, 544; 425/DIG. 37

[56] References Cited

U.S. PATENT DOCUMENTS

| | | | |
|---|---|---|---|
| 2,032,923 | 3/1936 | Eldrige | 264/504 |
| 2,106,808 | 2/1938 | Murphy et al. | 264/504 |
| 3,872,199 | 3/1975 | Ottinger | 264/500 |
| 3,964,850 | 6/1976 | Carnegie Jr. | 264/544 |
| 4,670,283 | 6/1987 | Cattini | 264/500 |

Primary Examiner—Jan H. Silbaugh
Assistant Examiner—Angela Ortiz
Attorney, Agent, or Firm—Patrick J. Schlesinger; Frank D. Gilliam

[57] ABSTRACT

A method and apparatus for making a preformed maskant sheet having a plurality of perforations corresponding to a pattern of perforations desired in a structure. A shaping surface is prepared on a sheet having the contours of the structure to be perforated. The surface is perforated in the precise desired pattern. A plenum is secured and sealed to the back of the shaping sheet, enclosing all of the perforations. A line for introducing air into the plenum is connected to the plenum. A coating of maskant material is sprayed onto the surface (which has mold release properties) while positive air pressure is maintained in the plenum. Air flows out through the perforations, keeping them clear of maskant. The maskant is then cured and the resulting self-supporting sheet is removed from the surface and placed against the structure to be perforated. The holes may then be formed by any suitable method, such as grit blasting etching or the like. The preformed masakant sheet is fully reusable with a succession of structures.

4 Claims, 1 Drawing Sheet

# METHOD FOR MAKING PREFORMED MASKANT SHEETS

BACKGROUND OF THE INVENTION

This invention relates in general to the forming of perforation patterns in structures and, more specifically, to the manufacture of preformed maskant sheets useful in the production of perforated parts.

The manufacture of various structures from sheet materials such as metal or composites having patterns of closely spaced holes or perforations is well known. Such structures have many applications such as acoustic panels, aircraft and space structures where weight savings are important, and the like. These perforations have in the past been formed by a wide variety of methods.

Most commonly, such perforations are formed by conventional machining, using drilling or milling operations. While effective, these methods have been largely superseded due to the difficulty in supporting sheet structures having complex shapes during machining, slow production even with the use of ganged drills and the difficulty in producing large, precise, patterns of perforations which often requires elaborate and expensive numerically controlled machines.

Where the structural shape is not too complex, punched sheets of maskant material may be placed over the structure and the perforations formed by grit blasting, or electrical etching or the like. However, with complex shapes, the maskant sheet stretches, distorting the perforation pattern. Also, tooling for punching other than flat maskant sheets is complex and expensive.

Thus, there is a continuing need for improved methods and apparatus for making maskant sheets for use in the more advanced methods of forming perforations in a wide variety of materials and for forming structures having complex shapes.

SUMMARY OF THE INVENTION

The above-noted problems, and others, are overcome by the method of this invention which basically comprises the steps of providing a sheet surface having the contours of the structure to be perforated and having a pattern of holes corresponding to the perforation pattern to be produced in said structure. A plenum is provided at the back of said sheet, enclosing all of the perforations. An air line is connected to the plenum for the introduction of air to provide positive pressure in the plenum. A selected maskant is sprayed onto said sheet surface while positive pressure is maintained in said plenum, so that air continuously flows out through the perforations, preventing maskant from bridging over the perforations or flowing into the perforations. Once the desired maskant thickness is attained, spraying is stopped and the maskant is cured. Air flow is preferably continued for as long as the maskant is fluid.

The resulting perforated maskant sheet is then stripped away from the shaping surface. The maskant sheet is tough but flexible and retains the contour of the shaping surface. The maskant can then be placed on the correspondingly-shaped structure to be perforated, and the perforations formed by any suitable method such as grit blasting, chemical etching, electrical etching, laser etching or the like. Grit blasting, undescribed, for example, in U.S. Pat. No. 4,612,737, is preferred for use with fiber reinforced resin structures. The maskant sheet is reusable.

BRIEF DESCRIPTION OF THE DRAWING

Details of the invention, and certain preferred embodiments thereof, will be further understood upon reference to the drawing, wherein.

DETAILED DESCRIPTION OF PREFERRED EMBODIMENTS

Figure 1:
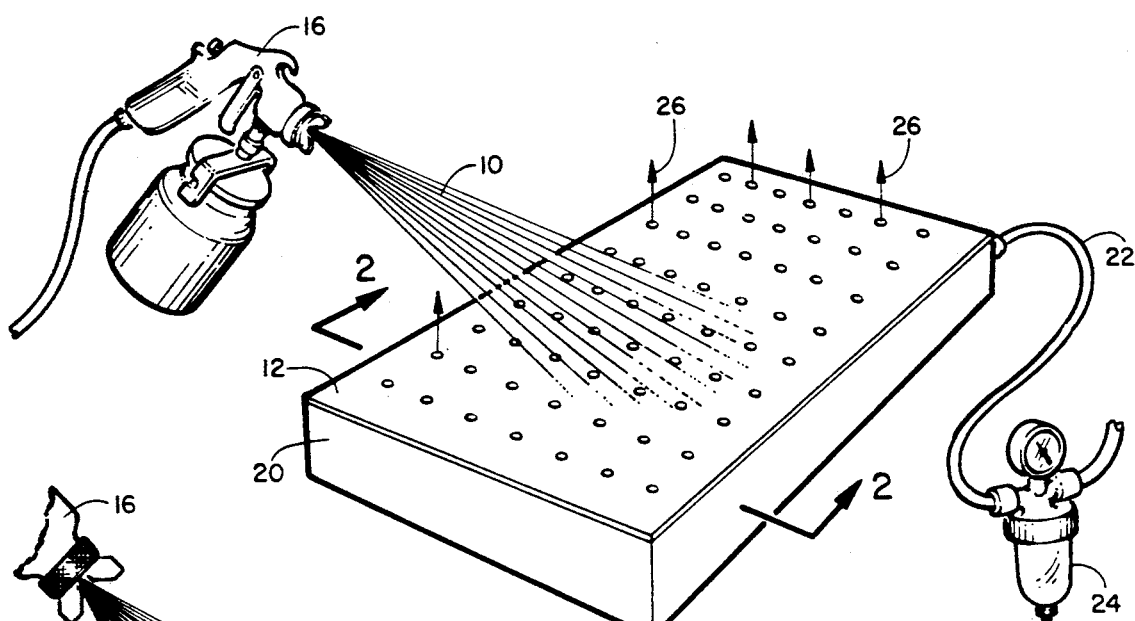
FIG. 1 is a schematic perspective view of forming the maskant by the method of this invention.
Figure 2:
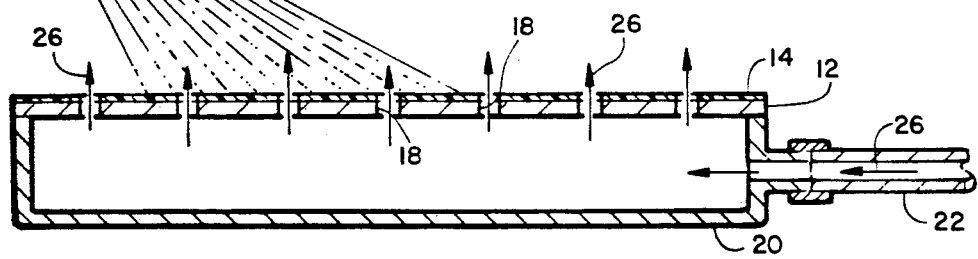
FIG. 2 is a vertical section through the shaping surface and plenum, taken on line 2—2 in FIG. 1.

Referring now to FIGS. 1 and 2, there is seen an arrangement for spraying a maskant-forming liquid 10 onto a shaping surface 12. In the embodiment shown, shaping surface 12 is planar for simplicity and clarity of illustration. Surface 12 may have any suitable configuration, typically with compound curves and undercuts. As detailed below, the cured maskant sheet 14 is resilient or rubbery and can easily removed from a complex surface and laid against a correspondingly shaped structure which is to be perforated.

Liquid maskant 10 can be sprayed against surface 12 using any suitable spray equipment 16. Typically, air or airless spray guns may be used, and electrostatic spray techniques may be used to increase spray precision and reduce overspray.

Surface 12 may be formed from any suitable material, which preferably has mold release properties or is coated with a mold release material to permit easy removal of a cured maskant 14. A typical mold release useful with many maskant materials is freecoat 700, available from the freecoat company.

Shaping surface 12 has a plurality of perforations 18 in a selected pattern across its surface. Perforations 18 may be formed in any suitable way, such as by drilling, punching, or molding surface 12 in a mold having a plurality of upstanding pins corresponding to the perforations, etc. The size of perforations 18 is somewhat exaggerated in FIG. 2 for clarity.

Any suitable maskant forming liquid 10 may be used. Typical sprayable maskants include Irathane #141 from Urathane Systems Inc., Polamine from Polaroid Corp., and Chemglaze Elastomeric Polyurethane tram lord chemical products. Of these, I have had best results with the chemglaze polyurethane.

A box-like plenum 20 surrounds the perforated area on the underside of shaping surface sheet 12 and is sealed thereto. A source of air 22 is connected to plenum 20 and is adapted to direct air thereinto. While any suitable air pressure may be used, fairly low pressure on the order of 5 to 25 psi as governed by air regulator 24 may be used with a 0.070 inch nozzle orifice size. The total air flow into plenum 20 and out through perforations 18, as schematically indicated by arrows 26, depends on the number of perforations, their cross sectional area and the characteristics of the maskant material. Air flow will be adjusted to a level which keeps perforations 18 clear of maskant while not unnecessarily blowing away maskant liquid.

Figure 3:
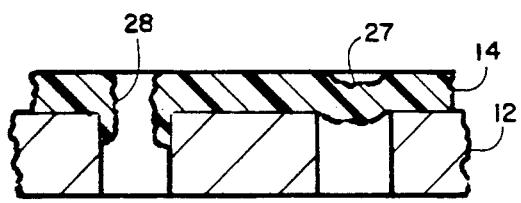
FIG. 3 is a schematic detail vertical section view; showing maskant sheet formation with insufficient air flow.
Figure 4:
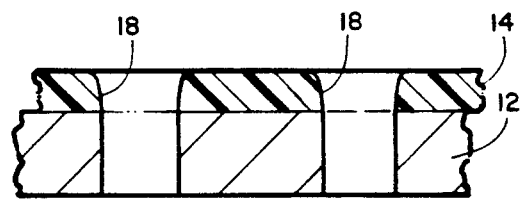
FIG. 4 is a schematic detail vertical section view, showing maskant sheet formation with proper air flow.

The effect achieved by using the air flow through perforations is illustrated in FIGS. 3 and 4, which schematically show detail section views taken through surface 12 and maskant 14. FIG. 3 shows the result with no air flow or insufficient air flow. Where air flow is insufficient, some perforations may be bridged by maskant 14, as seen at 26. Other perforations will have a small rims of maskant 28 extending down into the perforations in shaping surface 12. These rims will prevent the sheet of maskant from lying smoothly on a structure to be perforated.

With air flow properly adjusted, the maskant layer 14 will have the configuration at perforations 18 seen in FIG. 4. The walls of the perforations through maskant 14 will be substantially straight, with a slight curvature at the top. This maskant layer 14 will lie flat on a structure to be perforated and will permit all desired perforations to be formed with uniform shapes.

Figure 5:
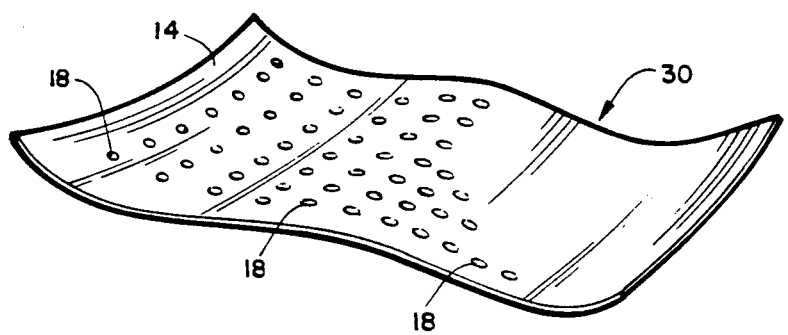
FIG. 5 is a perspective view of a typical preformed maskant sheet produced by the method of this invention.

After maskant 14 is sprayed to the desired thickness, it is cured in a conventional manner, such as by catalytic, thermal or solvent evaporation cure, to a flexible, resilient, self supporting sheet 30 as seen in FIG. 5.

Sheet 30 can then be applied to a structure having a corresponding surface. The structure may be formed from an advanced composite material (eg. graphite fibers in an epoxy resin matrix) a metal such as aluminum or titanium or any other suitable material. Sheet 30 will adhere uniformly, without distorting the perforation pattern or individual perforation shapes. If desired, especially where the structure has a complex configuration, a light coat of an adhesive, such as a stripable contact cement, may be applied to the structure surface and/or to the under surface of sheet 30. Perforations then may be formed through the structure by any conventional method which does not significantly damage the maskant sheet. Typical such methods include grit blasting (in which particles of abrasive grit are directed against the surface, entrained in a high velocity air stream) chemical etching, electrical etching and the like.

While certain preferred materials and configurations have been detailed in the above description of preferred embodiments, these may be varied, where suitable with similar results.

I claim:

1. The method of making a preformed perforated maskant sheet for use on a structure to be perforated to provide a desired surface contour and pattern of perforations therethrough which comprises the steps of:

providing a shaping surface on a sheet having a front and back surface, at least said front surface having the contour of said structure which is to be perforated;

said shaping surface further having a pattern of perforations therethrough corresponding to said desired pattern of perforations in said structure to be perforated;

sealing a plenum to said back surface of said shaping surface sheet, said plenum surrounding said pattern of perforations;

flowing air into said plenum and out through said perforations in said shaping surface;

while flowing said air spraying a coating of liquid maskant material onto said shaping surface;

curing said maskant material to a self supporting perforated sheet state; and removing said sheet from said shaping surface.

2. The method according to claim 1 wherein a mold release coating is applied to said shaping surface prior to spraying said maskant liquid thereagainst.

3. The method according to claim 1 wherein said air flow is sufficient to prevent maskant bridging any shaping surface perforations and to prevent maskant extending down into shaping surface perforations.

4. The method according to claim 1 wherein said maskant material is a polyurethane.

* * * * *